United States Patent [19]

Gros

[11] 4,447,582

[45] May 8, 1984

[54] METHOD OF PROCESSING LOW MOLECULAR WEIGHT EPM AND EPDM POLYMERS

[75] Inventor: Harold J. Gros, Baton Rouge, La.

[73] Assignee: Copolymer Rubber & Chemical Corporation, Baton Rouge, La.

[21] Appl. No.: 482,960

[22] Filed: Apr. 8, 1983

[51] Int. Cl.³ .................. C08L 51/06; C08L 23/26; C08L 23/28

[52] U.S. Cl. .................. 525/279; 525/283; 525/289; 525/290; 525/282; 525/293; 525/296; 525/292; 525/340; 525/343; 525/375; 525/379

[58] Field of Search .............. 525/289, 290, 279, 296

[56] References Cited

U.S. PATENT DOCUMENTS

| | | | |
|---|---|---|---|
| 3,261,888 | 7/1966 | Cornell et al. | 260/877 |
| 3,271,477 | 9/1966 | Kresge | 525/290 |
| 3,435,096 | 3/1969 | Limbert et al. | 525/290 |
| 3,483,273 | 12/1969 | Prucnal et al. | 525/290 |
| 3,657,395 | 4/1972 | Meredith et al. | 260/878 |
| 3,806,555 | 4/1974 | Nagaoka et al. | 525/290 X |
| 3,849,518 | 11/1974 | Severini et al. | 260/878 |
| 3,886,233 | 5/1975 | Visseren | 260/878 |
| 4,340,689 | 7/1982 | Joffrion | 525/263 |

*Primary Examiner*—Carman J. Seccuro
*Attorney, Agent, or Firm*—McDougall, Hersch & Scott

[57] ABSTRACT

A method of improving the handling of low molecular weight EPM or EPDM polymers which includes reacting the low molecular weight polymer with a monomer capable of providing quaternary salt forming groups and then cross linking the resulting polymer with a difunctional cross linking agent whereby the polymer takes on the characteristics of a high molecular weight polymer but which can be returned to the characteristics of a low molecular weight polymer upon exposure to elevated temperature.

26 Claims, No Drawings

METHOD OF PROCESSING LOW MOLECULAR WEIGHT EPM AND EPDM POLYMERS

This invention relates to a method for processing elastomeric materials in forming a solution of such elastomeric materials of low molecular weight in oil.

The invention will be described with reference to the use of ethylene-propylene polymers and copolymers as shear stable viscosity index improvers in solution in lubricating oils. Polymers of the types described that have the desired shear stability properties for use as a viscosity index improver are generally so low in molecular weight as to be difficult to handle or shipped from manufacturer to user in conventional rubber forms. To overcome this problems, use is currently being made of two different practices.

In one process the polymer is taken into an oil solution during production of the polymer and is never handled as a neat polymer. Such oil solutions, generally containing 5% to 15% by weight polymer, involves the handling and transportation of large volumes of oil. This markedly increases the cost of storage and transportation and thus penalizes the cost of the polymer.

In the other process, such as described in the U.S. Pat. No. 4,146,489, a high molecular weight rubber that can be handled in conventional rubber form for storage and shipment as a solid material, is subjected to mechanical and/or thermal degradation at the station of use to reduce the rubber to the lower molecular weight, either before or after the rubber is dissolved in oil. When degraded after the rubber has been dissolved in oil, very viscous solutions must be processed and the oil component is frequently degraded with the polymer. On the other hand, when the polymer is degraded before dissolving in oil, as in the aforementioned patent, a very low molecular weight, difficult to handle, viscous polymer results which is difficult to work with.

It is the object of this invention to provide a method and means for processing a shear stable viscosity index improver, in the form of an ethylene-propylene copolymer or terpolymer which is not encumbered by the problems associated with current processes; which is more energy efficient than current processes, and which enables the handling of the polymer during transportation and solution in a most simple, efficient and low cost manner.

In accordance with the practice of this invention an EPM or EPDM polymer of low molecular weight is grafted with a monomer capable of forming a quaternary salt, such as N,N-dimethyl-aminoethyl methacrylate (DMM) followed by cross linking with a difunctional cross linking agent such as dichloroxylene (DCX). Such grafted and cross linked polymer enjoys the characteristics of a high molecular weight polymer which enables recovery as a solid material by conventional means for separation and coagulation from the fluid system in which it is formed. With sufficient cross links, the resulting polymer can even be pelletized for simple packaging for storage or for shipment to distant stations for use.

However, when the grafted and cross linked polymer is dissolved in hot oil, such as at 250° to 450° F., the formed quaternary salt breaks down and the lower molecular weight (lower RSV polymer) exerts its normal influence as a viscosity index improver on the lubricating oil.

It has been found further that when the polymer is grafted to also contain a component having functional and/or polar groupings, such as derived from vinyl pyridine or including N-vinyl, 2-vinyl and 5-vinyl pyridine and corresponding vinyl pyrrolidones, the dispersant properties of the polymer in oil is greatly enhanced. When both the monomer capable of forming a quaternary salt and a monomer contributing functional groups are grafted or otherwise introduced onto the EPM or EPDM polymer of low molecular weight, the two groups of monomers may be grafted simultaneously in admixture or sequentially, first with the compound contributing the functional or polar groups and thereafter with the monomer capable of forming quaternary salts.

As the component capable of forming quaternary salts when grafted or otherwise incorporated into the EPM or EPDM polymer it is preferred to make use of dimethylaminoethyl methacrylate, diethylaminoethyl acrylate or diethylaminoethyl methacrylate. However, other dialkylamino acrylates, methacrylates, or acrylamides can be used such as dimethylaminoethyl methacrylate or acrylate, vinylimidazole, N-vinylcarbazole, N-vinylcarbazole, N-vinylsuccinimide, acrylonitrile, o-, m- or p-aminostyrene, maleimide, N-vinyl ozazolidone, N,N-dimethylaminoethyl vinyl ether, ethyl 2-cyanoacrylate, vinyl acetonitrile, N-vinylphthalmide, and 2-vinylquinoline; a variety of acrylamides and methacrylamides such as N-[1,1-dimethyl-3-oxobutyl] acrylamide, N-[dimethyl-1-ethyl-e-oxobutyl] acrylamide, N-(1,3-diphenyl-1-methyl-3-oxobutyl)methacrylamide, N,N-diethylaminoethyl acrylamide; and 2-hydroxyethyl acrylamide.

As the component contributing polar or functional groups when grafted or otherwise incorporated into the polymer, it is preferred to make use of a vinylpyrrolidone or a vinylpyridine such as N-vinyl, 2-vinyl and 5-vinyl pyridines or pyrrolidones. Other compounds which can be used include B-methyl-1-vinylpyrrolidone, 4-methyl-1-vinylpyrrolidone, 5-methyl-1-vinylpyrrolidone, 3-ethyl-1-vinylpyrrolidone, 3-butyl-1-vinylpyrrolidone, 3,3-dimethyl-1-vinylpyrrolidone, 4,5-dimethyl-1-vinylpyrrolidone, 5,5-dimethyl-1-vinylpyrrolidone, 3,3,5-trimethyl-b 1-vinylpyrrolidone, 4-ethyl-1-vinylpyrrolidone, 5-methyl-5-ethyl-1-vinylpyrrolidone, 3,4,5-trimethyl-3-ethyl-1-vinylpyrrolidone, and other lower alkyl substituted N-vinylpyrrolidones; N-vinylbenzyldimethylamine, N-dimethylaminopropyl acrylamide and methacrylamide, N-methacryloxyethylpyrrolidone, N-methacryloxyethylmorpholinone, N-maleimide of dimethylaminopropylamide, and the N-methacrylamide of aminoethylethylurea.

Cross linking agents which may be employed in the practice of this invention can be broadly defined as difunctional compounds capable of forming quaternary ammonium salts with tertiary amines. These functional groups include halides, sulfates, sulfonates and, in some cases, phosphates. It is preferred to make use of dichloroxylene (DCX) or tetrabromoethane (TBE) as the cross linking agent, but other compounds can be used as the cross linking agent in this invention. Usage can also be made of benzylic and allylic halides and aceto halides and sulfates, sulfonates and phosphates.

The amount of tertiary amine groups incorporated into the polymer can be relatively small, such as in the range of about 0.5 to 10 millimoles and preferably 0.75 to 7.5 millimoles of tertiary amine groups per 100 grams of polymer. When calculated on the weight basis, the tertiary amine can be incorporated in an amount within the range of 0.1 to 5% by weight of the polymer and preferably in an amount that does not exceed 1.5% by weight of the polymer. When use is made of the preferred DMM, it is incorporated by copolymerization or preferably by grafting onto the formed low molecular weight polymer in an amount within the range of 0.1 to 2.0 parts by weight per 100 parts by weight of polymer.

The cross linking agent is incorporated into the rubbery polymer grafted with the DMM or equivalent or with the DMM and N-vinylpyroolidone or equivalent in an amount within the range of 0.25 to 5.0 mols halogen per mol of tertiary amine, when based on the amine component or 0.05 to 4.0% by weight and preferably 0.25 to 2.5% by weight when based upon the grafted polymer.

When use is made of N-vinylpyrrolidone or other compound contributing functional or polar groupings, the N-vinylpyrrolidone is grafted onto the polymer in the ratio of about 1 to 5 parts by weight N-vinylpyrrolidone or equivalent per one part by weight polymer.

Although the preferred method in the practice of this invention involves the formation of quaternary ammonium salts by grafting a tertiary amine to the polymer and then crosslinking with difunctional compounds, it is understood that the opposite approach can also be used. In this case, compounds would be grafted onto the polymer which can be broadly defined as unsaturated active halogen, sulfate, sulfonate or phosphate compounds in which the unsaturated group is a polymerizable group. The crosslinking reaction is then carried out with the use of ditertiaryamine compounds. Examples of the materials to be grafted to the polymer include such compounds as dibromobutene-2, or other dihalogen compounds of the types described in U.S. Pat. No. 4,052,542, wherein the dihalogen groups are located in conjugated relation to the carbonyl group and in which the preferred halogens are chlorine and bromine. Usage can also be made of benzylic and allylic halides and aceto halides such as vinyl benzyl chloride and 5-chloroacetoxy-methyl-2,norbornene. In forming the quaternary crosslinking reaction, any active ditertiary amine can be used such as:

bis(dimethylamino)methane
1,6-bis(dimethylamino)hexane
N,N'-bis(diethylaminoethyl)analine
4,4-bis(diethylamino)benzophenone
1,4-bis(diethylamino)butene-2
4,4'-bis-diethylaminophenzylcarbinol
4,4'-bis(diethylamino)diphenyl silane
1,2-bis(diethylamino)ethane
N,N-bis(diethylaminoethyl)1,3-diaminopropane
2,6-bis(diethylamino)purine An additional method which can be used in the practice of this invention involves the simultaneous or sequential grafting of two different monomers onto the polymer, one of which contains a tertiary amine and the other containing a functional group capable of forming a quaternary ammonium salt with the tertiary amine. An example of such a two monomer system would be the dimethylaminoethyl methacrylate (DMM) and vinylbenzyl chloride (VBC). Other monomers such as those cited throughout this application could also be used.

EPM polymers are formed by interpolymerization of monomers of ethylene and one or more higher monoolefins having from 3 to 16 carbon atoms, preferably propylene. EPM interpolymers are formed of the same ethylene, one or more higher mono-olefins as described above, plus one or more polyenes. The polyene monomers may be selected of branched chain monomers, straight or branched chain polyene or cyclic polyenes containing 4 to 20 carbon atoms and preferably 5 to 10 carbon atoms and two carbon to carbon double bonds. The preferred straight chain polyene is 1,4-hexadiene but other straight chain dienes can be used, such as discussed in U.S. Pat. No. 3,884,993.

The polyene or other ethylenically unsaturated compound containing a plurality of carbon-to-carbon double bonds may be selected from those disclosed in the prior art for use as third monomers in the preparation of ethylene-propylene-polyene terpolymers, including open chain polyunsaturated hydrocarbons containing 4–20 carbon atoms, such as 1,4-hexadiene, monocyclic polyenes and polycyclic polyenes. The polyunsaturated bridge ring hydrocarbons or halogenated bridged ring hydrocarbons are preferred. Examples of such bridged ring hydrocarbons include the polyunsaturated derivatives of bicyclo (2,2,1) heptane wherein at least one double bond is present in one of the bridged rings, such as dicyclopentadiene, bicyclo(2,2,1)hepta-2,5-diene, the alkylidene norbornenes, and especially the 5-alkylidene-2-norbornes wherein the alkylidene group contains 1–20 carbon atoms and preferably 1–8 carbon atoms, the alkenyl norbornenes, and especially the 5-alkenyl-2-norbornenes wherein the alkenyl group contains about 3–20 carbon atoms and preferably 3–10 carbon atoms. Other bridged ring hydrocarbons include polyunsaturated derivatives of bicyclo(2,2,2) octane as represented by bicyclo(3,2,1) octane, polyunsaturated derivatives of bicyclo(3,3,1) nonane, and polyunsaturated derivatives of bicyclo(3,2,2) nonane.

Specific examples of preferred bridged ring compounds include 5-methylene-2-norbornene, 5-ethylidene-2-norbornene, 5-n-propylidene-2-norbornene, 5-isobutylidene-2-norbornene, 5-n-butylidene-2-norbornene, 5-isobutylidene-2-norbornene, dicyclopentadienes; the methyl butenyl norbornenes such as 5-(2-methyl-2-butenyl)-2-norbornene or 5-(3-methyl-2-butenyl)-norbornene, and 5-(3,5-dimethyl-4-hexenyl)-2-norbornene. The elastomer prepared from 5-ethylidene-2-norbornene is much preferred as it has outstanding properties and produces many unusual and unexpected results.

The elastomer may contain chemically bound therein molar ratios of ethylene to propylene varying between 95:10 ethylene to 5:90 propylene, and preferably between 70:30 ethylene to 55:45 propylene. The polyene or substituted polyene may be chemically bound therein to replace the ethylene or propylene in an amount of 0.1 to 10 mol percent, and preferably 0.3 to 1 mol percent, or in an amount to provide an actual unsaturation level of 2 double bonds per 1,000 carbon atoms in the polymer chain to unsaturation level as high as 100 double bonds per 1,000 carbon atoms in the polymer.

The interpolymerization reaction is carried out in the presence of a catalyst in a solvent medium. The polymerization solvent may be any suitable inert organic solvent that is liquid under reaction conditions and it may be a prior art solvent for solution polymerization of monoolefins in the presence of Ziegler type catalyst. Examples of satisfactory hydrocarbon solvents include straight chain paraffins having from 5–8 carbon atoms, with best results often being secured by the use of hexane, aromatic hydrocarbons and preferably an aromatic hydrocarbon having a single benzene nucleus, such as benzene, toluene and the like, and saturated cyclic hydrocarbons having boiling point ranges approximating those of the straight chain paraffin hydrocarbons and aromatic hydrocarbons described above, and preferably saturated cyclic hydrocarbons having 5-6 carbon atoms in the ring nucleus. The solvent selected may be a mixture of one or more of the foregoing hydrocarbons and preferably a mixture of aliphatic and naphthenic hydrocarbons having approximately the same boiling range as normal hexane. It is desirable that the solvent be dry and free of substances that will interfere with the Ziegler type catalyst used in the polymerization reaction.

Ziegler catalysts of the type well known to the prior art may be used. Such Ziegler type catalysts are disclosed in a large number of patents, such as U.S. Pat. No. 2,933,480, No. 3,093,620, No. 3,093,621, No. 3,211,709 and No. 3,113,115. Examples of Ziegler catalysts include metal organic coordination catalysts prepared by contacting a compound of a heavy metal of the group IV-a, V-a, VI-a and VII-a of the Mendeleeff periodic system of elements, such as titaniun, vanadium and chromium halides with an organo-metallic compound of a metal of groups I, II or III of the Mendeleeff periodic system which contains at least one carbon-metal bond, such as trialkyl aluminum, and allyl aluminum halides in which the alkyl groups contain from 1-20 and preferably 1-4 carbon atoms.

The preferred Ziegler catalyst for interpolymerization to product EPDM or EPM polymers is prepared from a vanadium compound and an alkyl aluminum halide. Examples of suitable vanadium compounds include vanadium trichloride, vanadium tetrachloride, vanadium oxychloride, vanadium acetyl acetonate, etc. Activators which are expecially preferred include alkyl aluminum chlorides of 3,113,115, general formula $R_1AlCl_2$ and $R_2AlCl$ and the corresponding sesquichlorides of the general formula $R_3Al_2Cl_3$, in which R is methyl, ethyl, propyl, butyl or isobutyl. In the catalyst system, the aluminum to vanadium mol ratio of the aluminum and vanadium compounds may be within the range of 5/1 to 200/1 and preferably within the range of 15/1 to 60/1, with best results being secured in the ratio of 40 aluminum to 1 vanadium. These same ratios apply with respect to corresponding compounds of others of the heavy metals substituted in the vanadium compound and the organo-metallic compounds of groups I, II and III for the aluminum compounds. A catalyst prepared from alkyl aluminum sesquichloride, such as the methyl or ethyl aluminum sesquichloride and vanadium oxychloride is preferred in the ratio of 1 mole vanadium oxychloride per 5-300 moles of aluminum and more preferably 15-60 moles of aluminum, with 40 moles of aluminum per mole of vanadium yielding the best results.

The polymerization is preferably carried out on a continuous basis in a reaction vessel closed to the outside atmosphere, which is provided with an agitator, cooling means and conduit means for continuously supplying the ingredients of the reaction including monomer, catalyst and accelerators and conduit means for continuously withdrawing solution containing elastomer. The polymerization is carried out in a liquid phase in the organic solvent in the presence of a Ziegler catalyst. The solution of elastomer in the polymerization solvent is withdrawn continuously from the reaction vessel, the catalyst is killed by the addition of a catalyst deactivator.

For use in the practice of this invention, it is preferred to make use of the low molecular weight polymers for grafting, especially for use with lubricating oils as viscosity improvers characterized by new dispersant properties. Such low molecular weight EPM and EPDM polymers are characterized by an average molecular weight less than 25,000 and preferably less than 15,000, but the grafting procedure of this invention can also be practiced with higher molecular weight EPM and EPDM polymers, especially when used for other purposes such as blending with other polymeric or resinous materials to introduce properties such as improved flexure strength, impact strength, ozone resistance and wear. When expressed on the basis of intrinsic viscosity, such low molecular weight EPM and EPDM polymers may range from 0.4 to 2.5 RSV.

The preparation of EPM and EPDM polymers is well known and is fully described in such patents as U.S. Pat. No. 2,933,480; No. 3,093,621; No. 3,211,709; No. 3,646,168; No. 3,790,519 No. 3,884,993; No. 3,894,999; No. 4,059,654, amongst many others.

For a description of ethylene-monoolefin copolymers or terpolymers, suitable for use as viscosity index improvers, and their method of manufacture, reference may be made to U.S. Pat. No. 4,146,489 and to the copending application of Joffrion, Ser. No. 76,386, filed Sept. 17, 1979, and entitled "Method of Grafting EPM and EPDM Polymers".

Having described the basic concepts of this invention, detailed description thereof will hereinafter be made by way of the following examples, which are given by way of illustration, and not by way of limitation.

The following are typical examples for the preparation of low molecular weight EPM and EPDM polymers.

EXAMPLE 1

In reactor 1, 1 liter of hexane is introduced into the reaction vessel. As the temperature is raised to 30° C., dry propylene was fed to the reactor until 42.4 inches of mercury pressure was reached. The pressure was then raised to 61 inches of mercury with a feed of dry ethylene and 6.03 millimoles (1.63 cc) of 5-ethylidene-2-norbornene and 1 cc of 1.5 molar ethyl aluminum sesquichloride were added.

The monomer feeds were stopped and the catalyst component, i.e. 0.545 molar solution of ethyl aluminum sesquichloride and 0.054 molar solution of vanadium oxytrichloride, at a 12 to 1 aluminum to vanadium ratio, were fed into the reactor at constant rate until a drop in pressure was noted. At this time, the gaseous monomers were fed into the reactor at a rate of 1501 cc per minute of which 692 cc were ethylene and 809 cc were propylene. The 5-ethylidene-2-norbornene was added as a 0.3 molar solution in hexane which also was 0.01 molar in pyridine, at a rate of 3.57 cc per minute to provide about 8.6% by weight for incorporation into the interpolymer. The polymerization was controlled by the catalyst pumps which added catalyst on demand in response to increased pressure. When the solution in the reactor contained 10% polymer, fresh solvent containing 16 cc of ethylene per cc of solvent was introduced into the reactor at the rate of 26.5 cc per minute and polymer cement was taken off continuously to produce 9.4 grams of polymer per hour.

At this time, the ethylene and propylene feeds were adjusted to 319 cc per minute and 1645 cc per minute, respectively, to compensate for the unreacted monomers removed with the cement. The feed rate of solution of 5-ethylidene-2-norbornene was adjusted to 4.23 cc per minute.

The resulting interpolymer contained ethylene and propylene in a ratio of 59 mole percent of chemically bound ethylene to 41 mole percent of chemically bound propylene and the molecular weight of the interpolymer, as measured by specific viscosity of 0.1% solution in Decalin at 135° C. was 1.88.

The level of unsaturation, based upon the amount of chemically bound 5-ethylidene-2-norbornene in the polymer was 10 carbon-to-carbon double bonds per 1,000 carbon atoms.

EXAMPLE 2

Into the reactor 1, ethylene at a rate of 17.6 lbs./hr., propylene at a rate of 62.3 lbs./hr. and hexane at a rate of 567 lbs./hr. are introduced with vanadium oxytrichloride catalyst at a rate of 0.063 lbs./hr., ethyl aluminum sesquichloride co-catalyst at a rate of 2 lbs./hr. and butyl perchlorocrotonate promoter at a rate of 0.25 lbs./hr. until 60° C. under 40 p.s.i.g. is reached to produce a low molecular weight EPM having a Mooney viscosity of less than 1(ML$_{1+8}$ at 300° F.) and containing approximately 41% ethylene and 59% propylene bound in the EPM polymer, In either of the examples, after the cement is drawn off from the polymerization vessel 1, the catalyst is killed by the addition of water and the admixture is subjected to high agitation to transfer the catalyst to the water phase. The mixture is then led to a decanter wherein the water phase is separated from the solvent phase containing 10% by weight of polymer in hexane.

In accordance with the preferred practice of this invention, the manufacture of EPM or EPDM polymers is interrupted at the cement stage and the grafting reactions are carried out on the polymer while in solution in the solvent in which the monomers are polymerized. This enables the grafting reaction to be performed on polymers having a molecular weight measuring as low as 0.4 RSV without the need to subject the formed polymer to degradation for reduction of molecular weight for solubilization. This enables use of a solvent system wherein the solvent component can enter into the grafting reaction and it makes a more desirable EPM or EPDM backbone polymer available for the grafting of various groupings thereon for new and useful applications.

It will, however, be understood that the low molecular weight polymers, employed in the practice of this invention, may be derived from higher molecular weight polymers which have been degraded as by the teaching of U.S. Pat. No. 4,146,489.

EXAMPLES 3 and 4

The following comparative examples were carried out with an ethylene-propylene polymer, prepared as in Example 2, having an RSV of 1.9 and a bound ethylene content of 55 mole percent. The polymer was grafted with DMM under the conditions hereinafter described.

The grafting reaction was done according to the method described in U.S. Pat. No. 4,340,689. When polymerization of the base polymer was complete, the reaction was shortstopped and the entire mixture was subjected to severe agitation for the purpose of washing out catalyst residues. The water phase containing the catalyst residue was then decanted off leaving behind the water saturated EPM cement. The cement was then concentrated to 24% solids which process also removed the remaining water. This batchwise simulation of the process in U.S. Pat. No. 4,340,689 used the same vessel for the concentration and the grafting reaction. The concentrated cement was then heated to 155° C. The grafting monomer, dimethylaminoethyl methacrylate (DMM) and the catalyst Di-Cup T (dicumyl peroxide) were added to the reactor in the amounts shown in the table below, and the reaction was allowed to take place for 60 minutes at 155° C. One-half of the solution was removed from the reactor to serve as a control. The remainder was crosslinked with an equimolar quantity of DCX with relation to the one-half of the original DMM by reacting it (DCX) for 15 minutes at 355° F. The entire crosslinked reacting solution was then cooled and then coagulated from the solution and dried.

One-half of the solution containing the grafted polymer was coagulated for separation from the solution to serve as a control. The remainder was cross linked with an equimolecular quantity of dichloroxylene (DCX) and then coagulated from the solution and dried.

| Polymer | |
|---|---|
| RSV | 1.9 |
| Mole % ethylene | 55 |
| Graft Conditions | |
| Solids, % | 24 |
| Temperature, °C. | 155 |
| Time, minutes | 60 |
| DMM, wt. % | 4.64 |
| Di-Cup T, phr | 2.37 |
| Product Properties | |
| Bound DMM, wt. % | 0.77 |
| Unreacted DMM, wt. % | 0.23 |
| Total DMM, wt. % | 4.146 |
| Cold Flow Observations | |
| 1.9 RSV EP | Excessive |
| 1.9 RSV/DMM | Poor |
| 1.9 RSV/DMM/DCX | None |

Determinations were made of the cold flow characteristics of the various polymers and of the polymers dissolved at a concentration of 1% by weight in oil to determine their effect on oil viscosity with the following results. The 1% solutions were prepared by stirring the finely chopped polymer in oil and heating to 350° F. The grafted polymer went into solution before the oil reached 350° F. whereas the cross linked polymer took 30 minutes before solution was completed at 350° F.

| Oil Solution Viscosities 1% in TL 8676 | |
|---|---|
| Polymer | Centistokes |
| 1.9 RSV/DMM | 12.06 |
| 1.9 RSV/DMM/DCX | 8.80 |

It will be seen from the results that the quaternary salt formed of the grafted cross linked polymer separated at elevated temperature with the result that the original low molecular weight or low viscosity polymer was left to exert its normal influence as an oil viscosity index improver.

The grafted polymers are added as viscosity improvers to lubricating oils in an amount within the range of 0.25–5.0% by weight of the oil.

EXAMPLE 5

This example illustrates the invention when another monomer is also grafted onto the base polymer to provide another property such as dispersancy. In this case, N-vinylpyrrolidone (NVP) is used. The data below show that although the NVP is a tertiary amine, it does not form the quaternary ammonium salt because of stearic hindrance from the polymer chain to which it is grafted. In this case, the addition of DMM as a grafted monomer provides the needed sites for the salt formation. In this example, the two monomers are grafted sequentially; however, example 6 shows that they may also be grafted simultaneously.

The procedures followed are basically the same as in examples 3 and 4 except in this case the NVP was allowed to react 20 minutes (15-30 minutes satisfactory) at the 155° F. reaction temperature using the amounts of NVP and Di-Cup T shown in the table below. Then DMM and more Di-Cup T were added and the total solution was allowed to react 20 minutes (15-30 minutes satisfactory). The reaction mixture was cooled to 140°-145° F. and then the DCX crosslinker was added and allowed to react one (1) hour. In this example, the cement solids content was 35%.

It can be seen from the table that polymer cold flow and the ability to be recovered and handled as a solid polymer are good to very good when both the DMM and the DCX are present. The solubility data in 20° C. hexane are an indication that a crosslink network exists when both the DMM and DCX are present. The viscosity data show the effect of dissolving temperature on the polymer solution properties. The viscosity of the crosslinked polymers dissolved at 125° C. are elevated showing the presence of the crosslinks. When dissolved at 175° C. the quaternary crosslinks are broken and the viscosity is very close to that of the starting polymer solution.

EXAMPLE 6. SIMULTANEOUS GRAFTING OF TWO MONOMERS

In this example, the procedure which was followed is basically the same as in examples 3 and 4. In this case, the cement solids content was 35%. The monomers and the catalyst were added to the hot cement (155° C.) in the amounts shown in the table below, and the reaction was allowed to proceed for one (1) hour. The temperature was then lowered 10 degrees and the DCX was added and allowed to react one (1) hour. The reaction mixture was then cooled to about 100° F. and the polymer was then coagulated and dried. The results shown in the table below indicate that crosslinking reaction was even more effective as shown by the higher solution viscosity of the solution prepared at 125° C. The viscosity of the oil solution prepared at 175° C. again shows that the crosslinks break down to yield properties of the lower RSV polymer solution.

TABLE II

| | | Simultaneous Grafting of Two Monomers | | | | | | | |
|---|---|---|---|---|---|---|---|---|---|
| | | Charge (Wt. % based on Rubber) | | | | Cold Flow and Recov. | Solubility in Hexane 20° C. | 10% Solutions in Solvent Neutral Oil (SNO), Kinematic Viscosity, 100° C. Centistokes | |
| Example | Polymer RSV | NVP | DMM | DiCup | DCX | | | Dissolve @ 125° C. | Dissolve @ 175° C. |
| A (Control) | 1.38 | 0 | 0 | 0 | 0 | V. Poor | V. Sol. | 480 | 426 |
| B | 1.38 | 3.7 | 1.0 | 1.6 | Yes | V. Good | Insol. | 1110 | 541 |

EXAMPLE 7. USE OF TBE AS CROSSLINKING AGENT

The sequential type grafts shown in the table below used basically the same procedure described in example 5. The data show that TBE can be used as the crosslinking agent in the practice of this invention and illustrates that other crosslinkers can be used.

TABLE III

| | | Use of TBE Crosslinking Agent | | | | | | |
|---|---|---|---|---|---|---|---|---|
| | | Charge (Wt. % based on Rubber) | | Cold Flow and Recov. | X-Linker | 10% Solutions in Solvent Neutral Oil (SNO), Kinematic Viscosity, 100° C. Centistokes | |
| Example | Polymer RSV | NVP/DiCup | DMM/DiCup | | | Dissolve @ 125° C. | Dissolve @ 175° C. |
| A (Control) | 1.38 | 0/0 | 0/0 | V. Poor | 0 | 480 | 426 |
| B (Control) | 1.38 | 4.64/1.3 | 1.2/1.0 | Poor | 0 | 560 | 447 |
| C | 1.38 | 4.64/1.3 | 1.2/1.0 | Good | DCX | 719 | 412 |
| D | 1.38 | 4.64/1.3 | 1.2/1.0 | Good | TBE | 769 | 488 |

EXAMPLE 8. USE OF EPDM AND 2-VINYLPYRIDINE

This example makes use of an EPDM containing 55 mole percent ethylene, 45 mole percent propylene and

TABLE I

| | | Sequential Grafts for Two Monomers | | | | | | |
|---|---|---|---|---|---|---|---|---|
| | | Charge (Wt. % based on Rubber) | | | Cold Flow and Recov. | Solubility in Hexane 20° C. | 10% Solutions in Solvent Neutral Oil (SNO), Kinematic Viscosity, 100° C. Centistokes | |
| Example | Polymer RSV | NVP/DiCup | DMM/DiCup | DCX | | | Dissolve @ 125° C. | Dissolve @ 175° C. |
| A (Control) | 1.38 | 0/0 | 0/0 | 0 | V. Poor | V. Sol. | 480 | 426 |
| B | 1.38 | 4.64/1.3 | 0/0 | Yes | Poor | Sol. | 583 | 486 |
| C | 1.38 | 4.0/1.3 | 0.7/0.7 | Yes | Good | Sl. Sol. | 623 | 446 |
| D (Control) | 1.46 | 0/0 | 0/0 | 0 | V. Poor | V. Sol. | — | 885 |
| E | 1.46 | 4.56/1.3 | 1.2/1.7 | Yes | V. Good | Insol. | 1544 | 954 |

3–5 carbon-to-carbon double bonds per 1000 carbon atoms provided by the termonomer 5-ethylidene-2-norbornene (EN). The 2-vinylpyridine (2-VP) is used as the tertiary amine grafting monomer as shown in the table below. The EPDM has a tendency to form irreversible crosslinks between adjacent EN groups during free radical graft reactions so adjustments in reaction solids content, grafting monomer and catalyst are made to minimize this undesirable reaction. The procedures are essentially as described in examples 3 and 4. In this example, a cement solids content of 25% is used. The table below shows the expected results.

TABLE IV

Use of EPDM and Vinylpyridine

| Example | Polymer RSV | Charge (Wt. % based on Rubber) 2-VP | DiCup | Cold Flow and Recov. | X-Linker | 10% Solutions in Solvent Neutral Oil (SNO), Kinematic Viscosity, 100° C. Centistokes Dissolve @ 125° C. | Dissolve @ 175° C. |
|---|---|---|---|---|---|---|---|
| A | 1.38 | 0 | 0 | V. Poor | 0 | 480 | 426 |
| B | 1.38 | 3.7 | 1.8 | V. Good | DCX | 795 | 480 |

In the foregoing examples, the grafting reaction temperature will depend upon the peroxide catalyst used. The dicumylperoxide used in the examples can be replaced in whole or in part with other peroxide catalysts such as t-butyl peroxide, benzoylperoxide, t-butylperoctoate, di-t-butyl-peroxide, t-butyl-hydroperoxide, cumene hydroperoxide, t-butyl perbenzoate, or other free radical source capable of hydrogen abstraction, as represented by alkyl peroxy esters, alkyl peroxides, alkyl hydroperoxides, diacyl peroxide and the like.

In practice, use is made of a reaction temperature above decomposition temperature for the catalyst. The reaction time depends somewhat on the solvent and the half life of the catalyst at a given reaction temperature. The aim is for a reaction time of 3 to 8 half lives in about one (1) hour. For example, with dicumyl peroxide, reaction at a temperature below 285° F. is so slow as to yield very poor results, yet at 315° F. the reaction is so rapid as to become inefficient. Too slow a reaction reduces the amount of monomer grafted onto the polymer and produces excessive amounts of homopolymer in those cases where the grafting monomer can homopolymerize.

The crosslinking reaction can take place at room temperature. However, it is too slow to be practical. The upper range of temperature would be at that point where the particular quaternary salt crosslink would begin to decompose. The overall temperature range can be 20° C.–200° C. but the preferred range is 50° C.–150° C. The ideal temperature range is ±10° C. from the grafting temperature for best fit into the total process.

As used herein, the term RSV is a standard viscosity measurement for estimating molecular weight and it relates to the intrinsic viscosity measured in Decalin at 135° C.

It will be understood that changes may be made in the details of formulation and operation without departing from the spirit of the invention, especially as defined in the following claims.

We claim:

1. A method of processing to improve the handling of an EPM or EPDM polymer of low molecular weight comprising the step of reacting the low molecular weight polymer with a monomer capable of providing quaternary salt forming groups on the polymer, and reacting the resulting polymer with a difunctional cross linking agent whereupon the cross linked polymer acquires the characteristics of a high molecular weight polymer which can be more easily handled and wherein the cross linked polymer can be broken down by exposure to elevated temperature to re-acquire the characteristics of the lower molecular weight polymer component.

2. A method as claimed in claim 1 in which the monomer reacted with the polymer to provide quaternary salt forming groups comprises an organic monomer containing tertiary amine groups.

3. A method as claimed in claim 2 in which the reaction to provide the polymer with quaternary salt forming groups is carried out by grafting the monomer onto the polymer.

4. A method as claimed in claim 2 in which the monomer reacted with the polymer to provide the quaternary salt forming group on the polymer is a dialkyl amino acrylate, a dialkyl amino methacrylate or acrylamide capable of reacting to provide tertiary amine groups on the polymer.

5. A method as claimed in claim 4 in which the monomer reacted with the polymer is selected from the group consisting of dimethylaminoethyl acrylate, dimethylaminoethylmethacrylate, diethylaminoethyl acrylate and diethylaminoethyl methacrylate.

6. A method as claimed in claim 4 in which the components are reacted in the ratio of 0.5 to 10 millimoles of tertiary amine groups per 100 grams of polymer.

7. A method as claimed in claim 4 in which the components are reacted in the ratio of 0.75 to 7.5 millimoles of tertiary amine groups per 100 grams of polymer.

8. A method as claimed in claim 4 in which the monomer is reacted in the amount of 0.1 to 5.0 percent by weight of the polymer.

9. A method as claimed in claim 4 in which the monomer is reacted in the amount of less than 1.5 percent by weight of the polymer.

10. A method as claimed in claim 1 in which the cross linking agent comprises an unsaturated active halogen compound in which the unsaturated group is a polymerizable group.

11. A method as claimed in claim 10 in which the unsaturated active halogen compound is a dihalogen compound having two halogen groups in conjugated relation to a carbonyl group.

12. A method as claimed in claim 1 in which the cross linking agent is selected from the group consisting of dichloroxylene, dibromoxylene, dibromobutene-2, and dichlorobutene-2.

13. A method as claimed in claim 10 in which the cross linking agent is reacted in the ratio of 0.25 to 5.0 moles of halogen per mole of monomer capable of providing a quaternary salt forming group.

14. A method as claimed in claim 10 in which the cross linking agent is reacted in an amount within the range of 0.05 to 4.0 percent by weight of grafted polymer.

15. A method as claimed in claim 1, which includes the step of reacting the polymer with a compound that contributes functional polar groups to the polymer.

16. A method as claimed in claim 15, in which the compound is reacted with the polymer before reaction of the polymer with the monomer capable of forming quaternary salt forming groups.

17. A method as claimed in claim 15, in which the compound is reacted with the polymer after reaction of the polymer with a monomer capable of forming quaternary salt forming groups.

18. A method as claimed in claim 15, in which the compound is selected with the polymer simultaneously with the monomer capable of forming quaternary salt forming groups.

19. A method as claimed in claim 15, in which the compound is selected from the group consisting of N-vinylpyrrolidone and N-vinylpyridine.

20. A method as claimed in claim 15, in which the compound is selected from the group consisting of B-methyl-1-vinylpyrrolidone, 4-methyl-1-vinylpyrrolidone, 5-methyl-1-vinylpyrrolidone, 3-ethyl-1-vinylpyrollidone, 3-butyl-1-vinylpyrrolidone, 3,3-dimethyl-1-vinylpyrrolidone, 4,5-dimethyl-1-vinylpyrrolidone, 4,5-dimethyl-1-vinylpyrrolidone, 5,5-dimethyl-1-vinylpyrrolidone, 3,3,5-trimethyl-1-vinylpyrrolidone, 4-ethyl-1-vinylpyrrolidone, 5-methyl-5-ethyl-1-vinylpyrrolidone, 3,4,5-trimethyl-3-ethyl-1-vinylpyrrolidone, and other lower alkyl substituted N-vinylpyrrolidones, N-vinylbenzyldimethylamine, N-dimethylaminopropyl acrylamide and methacrylamide, N-methacrylioxyethylpyrrolidone, N-methacryloxyethylmorpholinone, N-methacryloxyethylmorpholine, N-maleimide of dimethylaminopropylamine, and the N-methacrylamide of aminoethyethylneurea.

21. A method as claimed in claim 15 in which the compound is reacted in the ratio of 1 to 5 parts by weight of the compound per one part by weight polymer.

22. A method as claimed in claim 1 in which the monomer reacted to the polymer is selected from the group consisting of vinylbenzyl chloride, 5-chloroacetoxy-methyl-2-norbornene, dibromobutane-2, and dichlorobutene-2.

23. A method as claimed in claim 1 in which the cross-linking agent is a ditertiary amine selected from the group consisting of:
bis(dimethylamino)methane
1,6-bis(dimethylamino)hexane
N,N'-bis(diethylaminoethyl)analine
4,4-bis(diethylamino)benzophenone
1,4-bis(diethylamino)butene-2
4,4'-bis-diethylaminophenylcarbinol
4,4'-bis(diethylamino)diphenyl silane
1,2-bis(diethylamino)ethane
N,N-bis(diethylamino ethyl)1,3-diaminopropane
2,6-bis(diethylamino)purine 24. A method as claimed in claim 1 in which the functional groups of the difunctional cross linking agent are tertiary amine groups and the monomer is an active polymerizable halide.

25. A method as claimed in claim 15 in which the compound is a vinyl pyrrolidone or a vinyl pyridine.

26. A method as claimed in claim 25 in which the vinyl pyrrolidone or vinyl pyridine is selected from the group consisting of N-vinyl, 2-vinyl and 5-vinyl pyrrolidone or pyridine.

* * * * *